United States Patent
Zaacks et al.

(10) Patent No.: US 8,576,481 B2
(45) Date of Patent: Nov. 5, 2013

(54) METHOD AND APPARATUS OF DETECTING AN OPENING IN AN OPTICAL TRANSMISSION FIBER OF A ROPA SYSTEM

(75) Inventors: Mark Zaacks, Petach Tikva (IL); Uri Ghera, Tel Aviv (IL); David Menashe, Tel Aviv (IL)

(73) Assignee: Finisar Israel Ltd., Nes Ziona (IL)

( * ) Notice: Subject to any disclaimer, the term of this patent is extended or adjusted under 35 U.S.C. 154(b) by 687 days.

(21) Appl. No.: 12/849,172

(22) Filed: Aug. 3, 2010

(65) Prior Publication Data

US 2012/0033293 A1   Feb. 9, 2012

(51) Int. Cl.
| | |
|---|---|
| H04B 10/25 | (2013.01) |
| H01S 3/094 | (2006.01) |
| H04B 10/073 | (2013.01) |
| H04B 10/079 | (2013.01) |
| H01S 3/067 | (2006.01) |
| H01S 3/16 | (2006.01) |

(52) U.S. Cl.
CPC ........ *H04B 10/073* (2013.01); *H04B 10/07957* (2013.01); *H01S 3/06766* (2013.01); *H01S 3/094057* (2013.01); *H01S 3/1608* (2013.01)
USPC .................... 359/341.44; 398/20; 359/341.32

(58) Field of Classification Search
CPC .................... H01S 3/094003; H01S 3/094053; H01S 2301/02; H01S 3/1608; H04B 10/0775
USPC ..................................... 359/341.32
See application file for complete search history.

(56) References Cited

U.S. PATENT DOCUMENTS

| | | | |
|---|---|---|---|
| 5,321,707 A | 6/1994 | Huber | |
| 6,081,366 A * | 6/2000 | Kidorf et al. | 359/341.32 |
| 6,243,195 B1 * | 6/2001 | Pedersen et al. | 398/9 |
| 6,423,963 B1 | 7/2002 | Wu | |
| 6,433,926 B2 * | 8/2002 | Pedersen et al. | 359/341.43 |
| 7,031,049 B2 | 4/2006 | Kamada et al. | |
| 7,116,471 B2 | 10/2006 | Ghera et al. | |
| 7,251,072 B2 * | 7/2007 | Ohtani et al. | 359/341.3 |
| 7,283,292 B2 | 10/2007 | Ghera et al. | |
| 7,417,792 B2 * | 8/2008 | Hatae et al. | 359/341.43 |
| 7,499,212 B2 * | 3/2009 | Tsubaki | 359/341.41 |
| 7,508,575 B2 * | 3/2009 | Papernyi et al. | 359/334 |
| 7,554,721 B2 * | 6/2009 | Hiraizumi et al. | 359/344 |
| 7,665,909 B2 | 2/2010 | Perrier et al. | |
| 2006/0119931 A1 * | 6/2006 | Ghera et al. | 359/334 |
| 2006/0209394 A1 | 9/2006 | Papernyi et al. | |
| 2006/0274402 A1 * | 12/2006 | Ghera et al. | 359/334 |
| 2007/0177254 A1 * | 8/2007 | Ghera et al. | 359/334 |
| 2007/0285764 A1 * | 12/2007 | Sugliani et al. | 359/334 |
| 2008/0074734 A1 * | 3/2008 | Nissov et al. | 359/337 |

\* cited by examiner

*Primary Examiner* — Mark Hellner
*Assistant Examiner* — Ari M Diacou
(74) *Attorney, Agent, or Firm* — Nathan & Associates Patent Agents Ltd.; Menachem Nathan (57) ABSTRACT

Method and apparatus for detecting an opening in a transmission fiber connecting a discrete gain unit to a pump unit of a Remote Optically Pumped Amplifier (ROPA) system. The method comprises measuring an optical power entering the pump unit from the transmission fiber, the optical power being in a selected wavelength range, and establishing that the optical power lacks an ASE noise power component generated by the gain unit. The lack of this component indicates the presence of a break or opening in the transmission fiber, and triggers corrective action whereby pump lasers within the pump unit are shut down or have their power reduced to a safe level.

20 Claims, 10 Drawing Sheets

METHOD AND APPARATUS OF DETECTING AN OPENING IN AN OPTICAL TRANSMISSION FIBER OF A ROPA SYSTEM

BACKGROUND

Modern optical communication links utilize optical amplifiers to amplify wavelength division multiplexed (WDM) signal channels as they are transmitted through a link. The most common type of commercial optical amplifiers are Erbium doped fiber amplifiers (EDFAs). EDFAs belong to a broader class of amplifiers known as rare earth doped fiber amplifiers. EDFAs are self contained units, typically placed at intervals of 60-150 km along a fiber link. As with most optical amplifiers, EDFAs include a gain medium, specifically an Erbium doped fiber (EDF), and at least one pump laser. The gain medium serves to transfer energy from pump lasers within the EDFA to the optical signal channels as they pass through the EDFA, thus amplifying the signal channels. In most communications systems, the signal channels are located in the so called C-Band (1528-1565 nm). However, they may also be located in the L-Band (1570-1605 nm), and sometimes in adjacent wavelength bands Since an optical amplifier also includes pump lasers, it is necessary to supply it with electrical power in order for it to function. In cases where the amplifier needs to be placed in remote or inaccessible locations, this can become prohibitively expensive. For example, in a sub-sea communication link, the amplifier may need to be placed in a portion of a link which is submerged, requiring a very expensive submarine cable capable of transmitting electrical power from a landing station. Such an expensive cable may not be feasible or practical for all applications.

To address these and similar cases, Remote Optically Pumped Amplifiers (ROPAs) were developed, as described for example in U.S. Pat. Nos. 5,321,707, 7,508,575 and 7,665,909, and in U.S. patent application Ser. No. 12,202,100. In these amplifiers, the pump lasers are located along the communication link separately from the gain medium and utilize an optical fiber (in many cases the transmission fiber itself) to transfer the pump energy to the gain medium. Thus, the pump lasers may be placed at a location where it is easier to supply electrical energy, while the gain medium may be placed at another location which provides better Optical Signal to Noise Ratio (OSNR), and thus better overall link performance.

In general, the pump power delivered into the transmission fiber by the pump lasers can be 30 dBm and higher (see description of FIG. 1 below). Such high optical power propagating along the transmission fiber can pose a potential safety hazard to persons coming into contact with the system. Particularly, if the pump lasers are operated while a connector along the transmission fiber is open, or when there is a break or cut in the fiber, the pump energy may escape and cause harm to human eyes or skin, as well as material damage to the system. As used herein, the term "open fiber" refers to the state where there is an open connector or break or cut within the transmission fiber, or any other situation that could cause significant leakage of pump power from the fiber, thus posing danger to human eyes or skin coming in contact with the leaked power. The term "opening" is used to refer to the point along the fiber where the leakage of power occurs. Clearly, there is a need to immediately detect any such open fiber and shut down the pump lasers (or reduce their power to a safe level) within a time span short enough to avoid harm to human eyes (henceforth referred to as "eye-safe time"). Exemplarily, International Standard IEC 60825-2, "Safety of Laser Products—Part 2: Safety of optical fiber communication systems", may be viewed for a discussion of various aspects related to safety of laser products within fiber optic communication systems.

In other words, there is a need for an automatic shutdown mechanism in case of a safety hazard caused by an open fiber. The automatic shutdown mechanism should on one hand be as fail-safe as possible, and on another hand not be activated mistakenly by events that do not pose potential safety hazards. Another desired feature is that the shutdown mechanism should be an integrated feature of the ROPA system, to further enhance safety and to avoid dependence on other parts of the communication system.

These requirements have been partly recognized in the past, and a number of methods and systems have been disclosed to address the problem. For example, U.S. Pat. No. 6,423,963 discloses monitoring of an optical supervisory channel (OSC) existing in many commercial communication systems to detect an open fiber. One disadvantage of using an OSC for monitoring is that it is not present in all systems, and in any case it involves relying on a feature external to the ROPA system. Another disadvantage of using the OSC is that it constitutes a single point of failure in the system, i.e. failure of this channel will lead to shut-down of the ROPA, which in turn will shut-down the entire system. Furthermore, the OSC may be located in a wavelength band which is not amplified by the ROPA system, in which case it cannot be used. For example, in many cases the OSC is located at 1510 nm, which cannot be effectively amplified by an EDF based gain unit.

Another mechanism, disclosed in U.S. Pat. No. 6,423,963, is related to the monitoring of pump energy back-reflection, which can be used to detect certain types of open connectors but not fiber breaks or cuts. For example, opening a polished connector (PC) within a certain distance of the ROPA pump unit will cause a detectable increase in pump energy back-reflection. A main disadvantage of this solution is that it is not sensitive to certain types of open fibers (e.g. fiber breaks or cuts or open angle polished connectors (APC) connectors).

U.S. Pat. No. 7,031,049, and U.S. Pat. Nos. 7,116,471 and 7,283,292 (the latter two assigned to the present assignee) disclose the use of ASE noise created by the Raman scattering effect as pump energy propagates along a transmission fiber (sometimes referred to as amplified spontaneous scattering—ASS), in order to detect an open fiber. However, in ROPA systems, the ASE noise created by the ROPA gain unit is typically much higher than the ASE noise created by the Raman effect within the transmission fiber, such that detection methods relying only on Raman generated ASE are unusable in ROPA systems.

Thus, there is a need for methods and apparatus for detecting an opening in an optical transmission fiber which is indicative of a laser (or "safety") hazard for ROPA systems which does not suffer from the shortcomings described above. There is a further need for an automatic shutdown mechanism in case of a safety hazard caused by an open fiber in such systems. Specifically, the mechanism should be self-contained within the ROPA system, and not be dependent on other features of the communication system of which the ROPA is part. Furthermore, it should be sensitive to all types of open fibers, and it should provide real-time continuous detection of an open fiber during operation of the ROPA system.

SUMMARY

An aspect of some embodiments is related to providing improved methods and apparatus for detecting an opening in an optical transmission fiber of a ROPA system, the opening indicative of a laser hazard or safety hazard.

There is therefore provided in accordance with an embodiment a method of detecting an opening in an optical transmission fiber of a ROPA system which includes a pump unit having one or more pump lasers, the pump unit remotely coupled to a discrete gain unit through the optical transmission fiber, the gain unit having a gain medium which generates a gain medium ASE noise, the method comprising the steps of: measuring an optical power in a selected wavelength range, the optical power transmitted through the transmission fiber, and determining that the measured optical power lacks a gain medium ASE noise power component, wherein the lack of the gain medium ASE noise power component indicates that the optical transmission fiber is open.

In an embodiment, the method further comprises the step of: responsive to an indication that the optical transmission fiber is open, performing an action on the one or more pump lasers to remove a laser hazard due to the open optical transmission fiber.

There is therefore provided in accordance with an embodiment a method of detecting an opening in an optical transmission fiber of a remote optically pumped amplifier system which includes a pump unit having one or more pump lasers, the pump unit remotely coupled to a discrete gain unit through the optical transmission fiber, the gain unit having a gain medium which generates a gain medium amplified spontaneous emission (ASE) noise, the method comprising the steps of: determining whether a gain medium ASE noise power component is present or absent in an optical power within a selected wavelength range entering the pump unit from the transmission fiber, wherein the absence of the gain medium ASE noise power component indicates that the optical transmission fiber is open, and, responsive to an indication that the optical transmission fiber is open, performing an action on the one or more pump lasers to remove a laser hazard due to the open optical transmission fiber.

There is therefore provided in accordance with an embodiment an apparatus for detecting an opening in an optical transmission fiber of a ROPA system which includes a pump unit having one or more pump lasers, the pump unit remotely coupled to a discrete gain unit through the optical transmission fiber, the gain unit having a gain medium which generates a gain medium ASE noise, the apparatus comprising: a measuring unit used to measure an optical power in a selected wavelength range, the optical power entering the pump unit from the transmission fiber, and a control unit used to monitor the measured optical power and to determine whether the optical power lacks a gain medium ASE noise power component, wherein the lack of the gain medium ASE noise power component indicates that the optical transmission fiber is open.

In an embodiment, the measuring unit includes an ASE filter used to select a wavelength range from the optical power, the selected wavelength range separating wavelength-wise the ASE noise from signal channels.

BRIEF DESCRIPTION OF THE DRAWINGS

Non-limiting examples of embodiments are described below with reference to figures attached hereto that are listed following this paragraph. Identical structures, elements or parts that appear in more than one figure are generally labeled with a same numeral in all the figures in which they appear. The drawings and descriptions are meant to illuminate and clarify the embodiments, but should not be considered limiting in any way.

DETAILED DESCRIPTION

Figure 1:
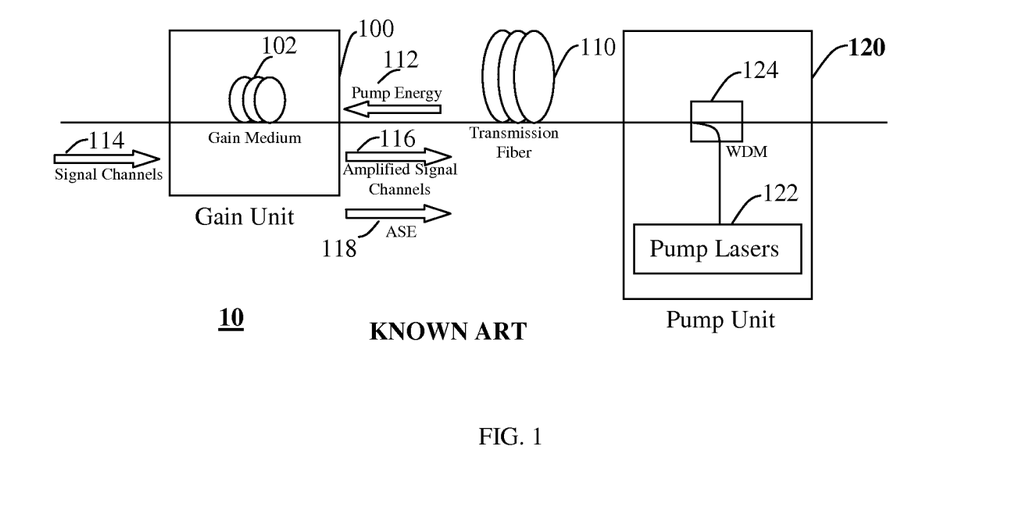
FIG. 1 shows schematically an exemplary known ROPA system.

FIG. 1 shows schematically an exemplary known ROPA system 10. The ROPA system comprises a discrete gain unit 100, a transmission fiber 110, and a pump unit 120. The configuration shown is a ROPA in which pump unit 120 is located at a receiver terminal of the communication link, or at one of a plurality of repeater stations along the link, while gain unit 100 is located at some point upstream along the fiber span that links the location of pump unit 120 with a previous repeater station or terminal. Thus, gain unit 100 divides the fiber span into two sections, with transmission fiber 110 constituting the second section of the fiber span. In a typical ROPA application, the length of transmission fiber 110 is in the range of 50-100 km and in some cases up to 150 km. In operation, gain unit 100 provides optical amplification (typically in the range of 10-25 dB) to signal channels 114 which enter into it after propagating along the first section (not shown) of the fiber span, thus creating amplified signal channels 116 as well as ASE noise 118. The optical amplification provided by gain unit 100 is enabled by pump energy 112 generated by pump unit 120 and transmitted to gain unit 100 via transmission fiber 110.

Pump unit 120 comprises one or more pump lasers 122 and a wavelength division multiplexer (WDM) 124 for multiplexing the output of pump lasers 122 into transmission fiber 110. The generated pump energy 112 propagates in a direction opposite to that of signal channels 114. Gain unit 100 comprises a gain medium 102, which is responsible for amplifying the signal channels and which also generates ASE noise. This gain medium may be for example an EDF, some other type of rare-earth doped fiber, a non-linear fiber used for parametric or Raman amplification, a rare earth doped waveguide, or any other type of gain medium which can be pumped using remotely generated optical power. The pump lasers are selected such that the pump energy reaching the gain medium is located in one of the pump bands of the gain medium, and is sufficiently high to provide a net amplification for signal channels 114.

In an exemplary case in which the gain medium is EDF, pump energy 112 may be located in the 1480 nm pump band (e.g. 1465-1495 nm), and should be higher than about 5 dBm. In this pump band, transmission fiber 110 typically exhibits an attenuation of about 0.25 dB/km. Assuming it is about 80 km long, its total attenuation for the 1480 nm pump band is about 20 dB. Thus, taking into account additional margins and losses, pump lasers 122 should generate about 30 dBm or more of pump power within the 1480 nm pump band. Clearly, the exact amount of pump power required depends on the exact length and losses of transmission fiber 110, the specifications of the EDF, and the amount of gain required for signal channels 112. To produce the required power in the 1480 nm pump band, pump lasers 122 may comprise a 1480 nm fiber laser or pump laser diode, or multiple polarization and/or wavelength multiplexed pump laser diodes.

Optionally, cascaded Raman pumping may be employed as described in U.S. Pat. No. 7,508,575. In this case, pump lasers 122 also produce pump power at shorter wavelengths than the 1480 nm pump band, and the Raman effect within transmission fiber 110 is used to transfer pump power from the shorter wavelength to the 1480 nm pump band.

One or more optical isolators may be inserted into gain unit 100 to decrease back-reflections in the ROPA system, which may lead to signal oscillations and/or increased ASE noise and/or reduced signal gain. These isolators may be placed at either end of the gain medium, as well as between different sections which may comprise the gain medium. In cases where an isolator may obstruct the propagation of the pump energy within the gain medium, WDMs similar to WDM 124 may be employed within the gain unit to route the pump energy around respective obstructing isolators.

Variations of ROPA systems exist in which the pump energy is delivered to the gain unit via a different fiber than the actual transmission fiber used for the signal channels. The two fibers may be located within the same fiber cable. Other variations exist where the ROPA is pumped in a forward pumping configuration, i.e. where the pump energy and signal channels propagate in the same direction along the gain medium. Still other variations exist where the pump unit is placed upstream of the gain unit along the communication link, instead of downstream of the gain unit.

Figure 2A:
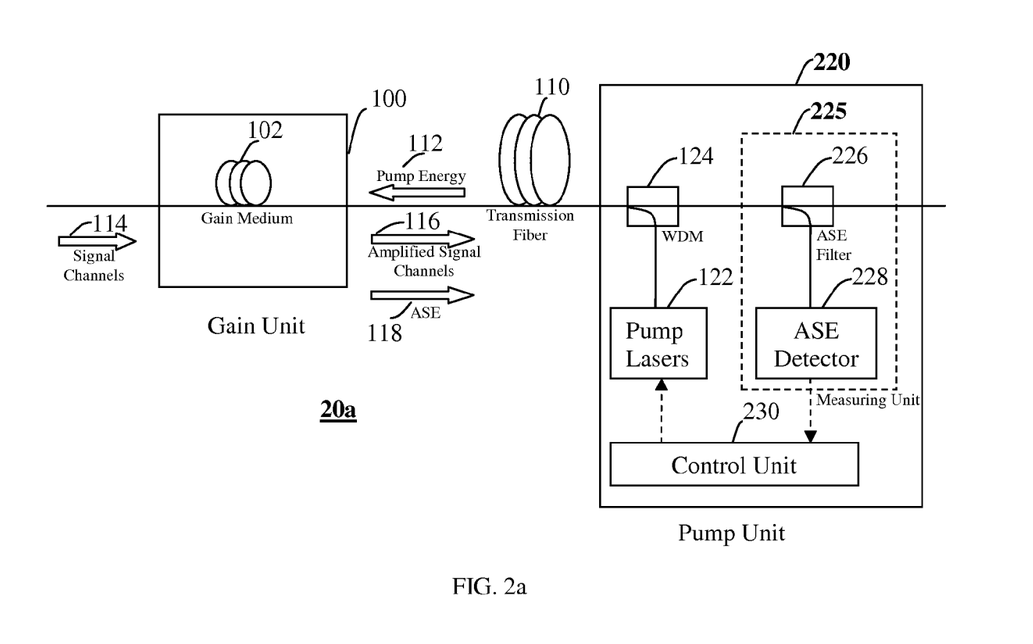
FIG. 2a shows schematically a ROPA system in accordance with an embodiment disclosed herein.

FIG. 2a shows schematically a ROPA system 20a in accordance with an embodiment disclosed herein which provides a solution to the problem of the safety hazard caused by an open fiber. In common with ROPA system 10, ROPA system 20a comprises discrete gain unit 100 with gain medium 102 and transmission fiber 110. However, in contrast with ROPA system 10, ROPA system 20 includes a pump unit pump unit 220 which includes (in addition to one or more pump lasers 122 and WDM 124) a measuring unit 225 comprised of an ASE filter 226 and an ASE detector 228. ASE filter 226 directs only a selected wavelength range of the optical power entering pump unit 220 from transmission fiber 110 to ASE detector 228, while at the same time allowing wavelengths outside the selected range to pass through ASE Filter 226 to an output of pump unit 220 with minimum attenuation. Hereinafter and throughout this description, the term "optical power within a selected wavelength range" refers to the optical power directed by and ASE filter such as filter 226 to and ASE detector such as detector 228. ASE detector 228 measures the optical power within the selected wavelength range and outputs a corresponding electrical signal to a control unit 230. Further in contrast, pump unit 220 also includes a control unit 230 configured to analyze the incoming electrical signal, and, based on this analysis, to determine whether transmission fiber 110 is open or not. If control unit 230 determines that the transmission fiber is open, it sends a control signal to pump lasers 122 to shut down or reduce their output optical power to a safe level. In some embodiments, measuring unit 225 may be located separately from pump unit 220. In other embodiments, control unit 230 may be located separately from the pump unit and/or measuring unit 225.

Figure 2B:
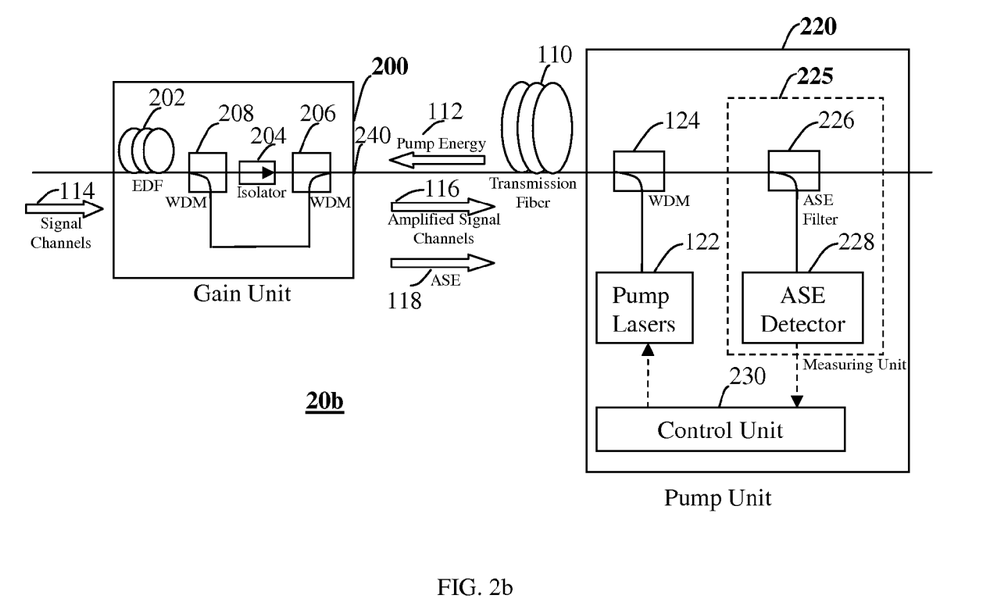
FIG. 2b shows schematically a ROPA system in accordance with another embodiment disclosed herein.

FIG. 2b shows schematically a ROPA system 20b in accordance with another embodiment disclosed herein. In system 20b, a discrete gain unit 200 includes as gain medium an EDF 202, the EDF representing a specific example of a gain medium. Gain unit 200 further includes an isolator 204 designed to block Raman amplified back-reflections from transmission fiber 110 entering EDF 202, which may degrade the performance of the ROPA. Gain unit 200 further includes a first WDM 206 and a second WDM 208 which are used to route pump energy 112 around the isolator and into the EDF. The description continues with reference to gain units having EDF as gain medium (e.g. as in FIG. 2b), with the understanding that this is only a specific and by no means limiting example of a gain medium.

Figure 3:
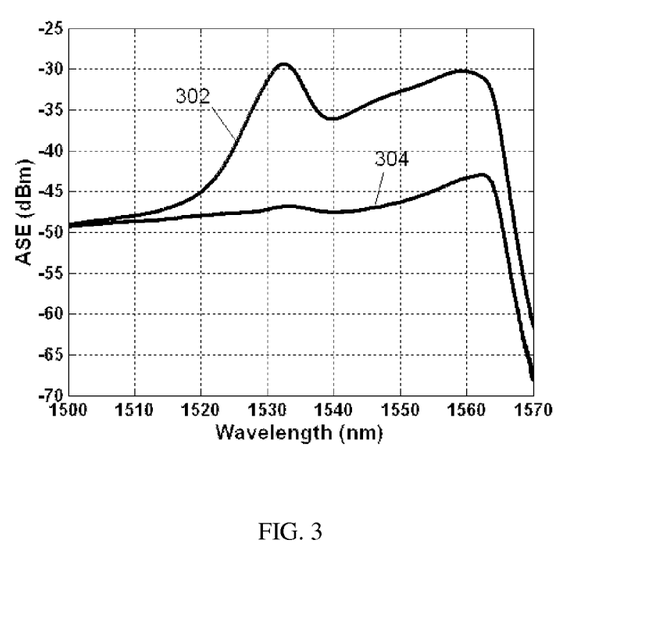
FIG. 3 shows the ASE spectrum at the input of a ROPA pump unit in accordance with an embodiment disclosed herein in the case of an open fiber and in the case of a non-open fiber.
Figure 4:
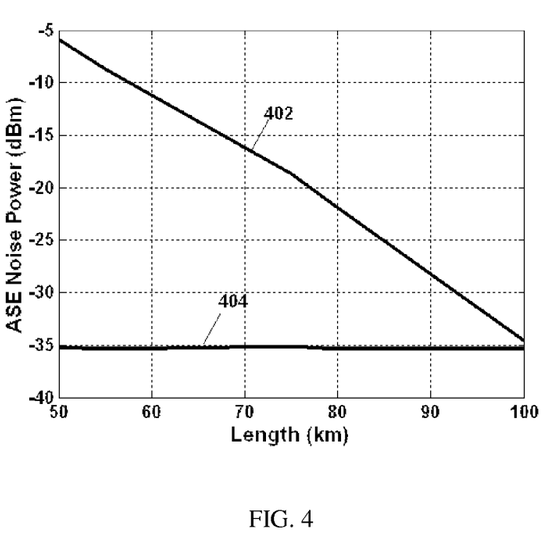
FIG. 4 shows the measured ASE noise power in a selected wavelength band as a function of transmission fiber length, for the cases of an open fiber and a non-open fiber.

The operation of ROPA system 20b is now explained by way of example with the aid of FIG. 3 and FIG. 4. FIG. 3 shows exemplary measured ASE noise spectra entering pump unit 220 for two cases: an ASE noise spectrum 302 when transmission fiber 110 was not open, and an ASE noise spectrum 304 measured when transmission fiber 110 was open at a position 240 closest to gain unit 200 (i.e. at the connection between transmission fiber 110 and gain unit 200). Therefore, curve 302 shows the sum of the ASE noise generated by gain unit 200 and the ASE noise generated due to the Raman effect in transmission fiber 110, while curve 304 shows only the noise generated due to the Raman effect in transmission fiber 110. The measurements shown in FIG. 3 were taken under the following conditions: pump lasers 122 included three diode lasers such that the pump energy injected into transmission fiber 110 was 300 mW power at 1425 nm and 570 mW power at 1475 nm; transmission fiber 110 consisted of 75 km of standard Single Mode Fiber (SMF); pump energy 112 entering gain unit 110 consisted primarily of 10 mW at 1475 nm, as well as some residual power (<1 mW) at 1425 nm; the length of EDF 202 was 18 m, optimized for amplification within the C-Band; and the ASE noise spectrum was measured using an Optical Spectrum Analyzer with a resolution bandwidth of 0.1 nm.

As can be seen from FIG. 3, curve 302 shows higher ASE noise power than curve 304, which is to be expected since curve 302 also includes the contribution of ASE noise from gain unit 200. If transmission fiber 110 is open in any location along its length, then the ASE noise power entering pump unit 220 will always be lower than curve 304, since curve 304 represents the extreme case where the opening is located adjacent to gain unit 200. This is due to the fact that the Raman ASE noise power depends on the length of a non-interrupted fiber, so that when the opening is located at position 240, the Raman ASE noise power is maximal. Therefore, the measurement of the ASE noise power in a selected wavelength range can identify whether transmission fiber 110 is open at any point along the fiber, or not open. If the measured noise power in a selected wavelength range is above the value determined from curve 304, this means that transmission fiber 110 is not open, whereas if it is below the value determined from curve 304, then transmission fiber 110 is open. The difference between curve 302 and curve 304 depends on wavelength, with the largest difference occurring at about 1532 nm, in which case the difference is about 17 dB. Clearly, it is advantageous to measure the ASE noise power in a selected wavelength range where the difference between the two curves is maximal, as this allows maximum differentiation of an open fiber from a non-open fiber. However, in other cases it may be advantageous to use a wide selected wavelength range, even as wide as the entire communication band, thus easing requirements on ASE filter 226 and even allowing this filter to be replaced with a simple tap. Hereinafter, reference to "ASE noise power" means "ASE noise power in a selected wavelength range".

In an embodiment, an optional criterion for selecting the wavelength range for ASE measurement may be that no signal channels be present within the selected wavelength range. While this criterion may not be essential when utilizing a fixed decision threshold to identify an open fiber (see below), it can facilitate the actual process of setting the threshold. Furthermore, this criterion can be applied when using a differential mechanism to identify an open fiber (see below). In many communications systems employing ROPA, signal channels are restricted to part of the C-Band, typically 1540-1562 nm. In such cases, the selected wavelength range for ASE measurement can be located within the range 1530-1535 nm, where the difference between curves 302 and 304 is maximal. In cases where the signal channels cover the entire C-Band, the selected wavelength range for ASE measurement may be located outside the C-Band, for example in the vicinity of 1525 nm or 1565 nm. Alternatively, if the location of the signal channels within the C-Band is known, ASE Filter 226 can be defined such that the selected wavelength range includes only those parts of the C-Band where no signal channels exist, and does not include those parts of the C-Band where signal channels exist. For example, if the signal channels are located on a 100 GHz grid within the C-Band, then ASE Filter 226 may consist of a 100 GHz comb filter offset by 50 GHz from the signal channel grid.

As with any filter, ASE filter 226 may be non-ideal in that some of the signal channels optical power outside the selected wavelength range leak through the filter towards ASE detector 228. In such a case the filter may be designed for typical operating conditions of the ROPA, such that unwanted leakage power should be much below (typically at least 30 dB below) the ASE noise power generated by gain unit 200 in the selected wavelength range.

It should be noted that curve 302 was measured when no signal channels were input to gain unit 200. However, since ROPA systems usually operate in the so-called small signal regime of optical amplifiers (typically, the total aggregate signal channel input power is smaller than about −15 dBm), the presence or absence of signal channels should not have a significant effect on curve 302.

FIG. 4 shows the ASE noise power at the input to pump unit 220 in a selected wavelength range (in this case a 0.5 nm-width range centered at 1531.9 nm—see below) as a function of the length of transmission fiber 110. The measurement conditions with which FIG. 4 was produced are the same as described in the context of FIG. 3, with the exception that the length of transmission fiber 110 was varied as part of the measurement. The optical power within the selected wavelength range was directed via ASE filter 226 to ASE detector 228, which was calibrated to measure the power at the input to pump unit 220. The selected wavelength range, as determined by the design of ASE filter 226, had a center wavelength of 1531.9 nm and a pass-band of width 0.5 nm centered around this wavelength. Thus, the power reaching ASE detector 228 consisted primarily of the ASE noise power in a 0.5 nm vicinity of 1531.9 nm, and did not include a significant contribution from the signal channels, which were assumed to be located at wavelengths higher than 1535 nm (for example 1540-1562 nm).

Curve 402 shows the ASE noise power when transmission fiber 110 was not open, i.e. including the ASE generated by gain unit 200. Curve 404 shows the ASE noise power when transmission fiber 110 was open at position 240, i.e. not including the ASE generated by gain unit 200. The difference between the two curves ranges from just under 30 dB for a 50 km long transmission fiber to approximately 7 dB for a 90 km long transmission fiber. Thus, if for example a fixed decision threshold is used to differentiate an open fiber from a non-open fiber, then this threshold could be set to correspond to a measured ASE power of −32 dBm. This would allow for a margin of error of at least 3 dB on each side of the decision threshold, thus providing a stable mechanism for detecting an open fiber for a transmission fiber up to 90 km long. When utilizing a fixed decision threshold, it is not essential that the selected wavelength range exclude signal channels, as long at the threshold lies between curve 402 and curve 404. However, the exclusion of signal channels facilitates the actual process of setting the threshold, since for a given length of transmission fiber the value of curve 404 may be measured in real time, even when the system is functioning, and then the threshold may be set to some desired value relative to and below the measured value.

Alternatively, instead of setting a fixed decision threshold, control unit 230 may utilize a differential mechanism whereby a decrease by a certain amount of the measured ASE noise power within a certain timeframe means that an opening has occurred in transmission fiber 110. Such a mechanism potentially allows openings to be stably detected in transmission fibers longer than 90 km. For example, for transmission fibers up to length 100 km, the difference between curves 402 and 404 is always larger than 0.5 dB. Thus, a decrease of at least 0.5 dB in a short timeframe (typically <10 ms, and always shorter than the eye-safe time) could be used as an indicator of an open fiber. If such a differential mechanism is utilized in an embodiment, then in that embodiment the selected wavelength range can exclude signal channels, so that add/drop of signal channels, or changes in signal channel power, do not activate the mechanism.

While the operation of the system shown in FIG. 2*b* was described in relation to the specific example shown in FIG. 3 and FIG. 4, it should be understood that the disclosed system and method for detecting an opening in a transmission fiber is general and can be applied in other ROPA systems. Exemplarily, such other ROPA systems may employ different pump lasers, have a different type of transmission fiber, have a different construction of the gain unit, employ a different gain medium (e.g. as in FIG. 2*a*), or provide amplification in a wavelength band other than the C-Band.

Figure 5:
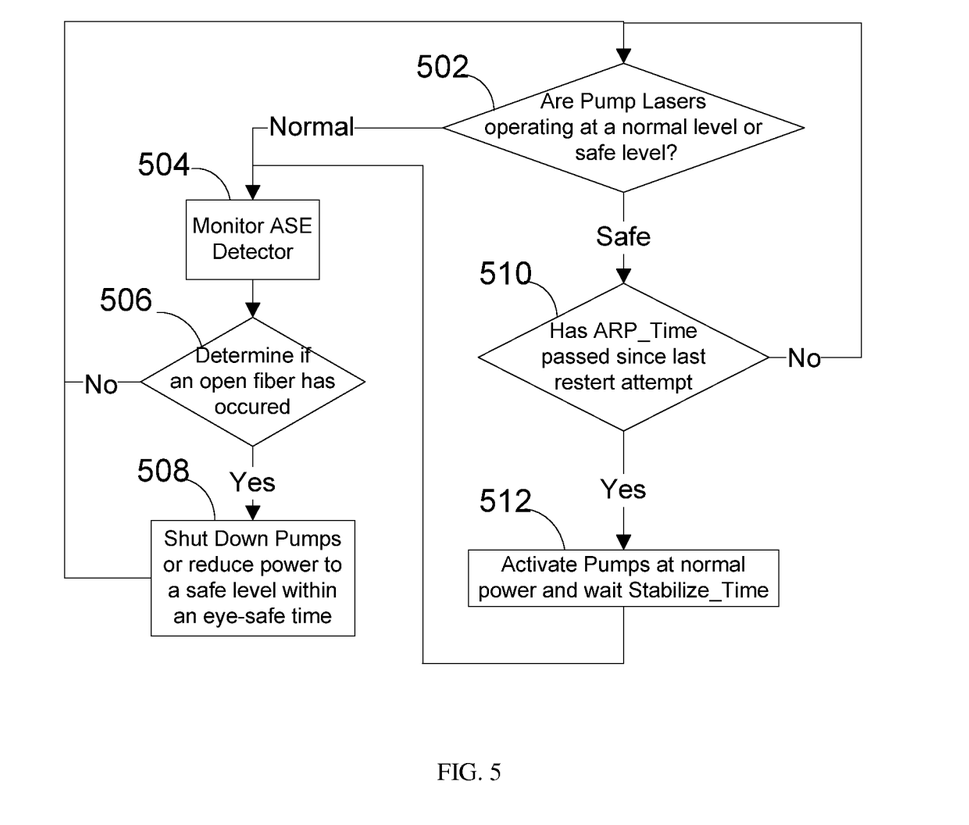
FIG. 5 shows a flowchart describing in more detail the operation of a control unit in a ROPA system in accordance with an embodiment disclosed herein.

FIG. 5 shows a flowchart describing in more detail the operation of control unit 230. The process begins with step 502, which checks whether pump lasers 222 are operating at normal operating power (i.e. the power at which the ROPA system normally operates) or whether the pump lasers are operating at a safe level (i.e. either shut-down, or below the level required for eye-safe operation). If the pump lasers are operating at normal operating power, then in step 504 the ASE noise power in the selected wavelength range is monitored using ASE detector 228. Step 506 then determines, based on the measured ASE noise power, whether or not transmission fiber 110 is open. This may be achieved by comparing the measured ASE noise power to a fixed pre-determined threshold, or by comparing the ASE noise power to previously stored measurements, and determining that the ASE noise power has decreased by a pre-determined amount within a pre-determined timeframe (as discussed in the context of FIG. 3 and FIG. 4 above). Furthermore, both methods can be employed such that an open fiber is determined if either one of the two conditions is fulfilled. If an open fiber has not been determined, then control returns to step 502 and the process is repeated. If an open fiber has been determined, then step 508 is executed in which pump lasers 122 are either shut-down or their power is reduced to below the level required for eye-safe operation. Then control is returned to step 502 and the process is repeated. In order to ensure that step 508 is carried out within an eye-safe time after the occurrence of an open fiber, the check in step 506 should be carried out with a sufficiently high repetition rate (e.g. at least once every 10 ms), while the actual process of shutting down the pump lasers or reducing their power should be sufficiently short (e.g. less than 10 ms).

Returning to step 502, in the case where the pump lasers are operating at a safe level, then optionally an Automatic Restart Procedure (ARP) may be implemented, as described in steps 510 and 512. The purpose of this procedure is to attempt to restart the pumps at pre-defined intervals, and then check if transmission fiber 110 is open, in which case the pumps are shut-down (or their power reduced) until the next attempt. Step 510 checks whether sufficient time (an "ARP time") has passed since the last restart attempt. The ARP time may exemplarily be of the order of a few minutes. If sufficient time has not passed, then control is returned to step 502. If sufficient time has passed, then step 512 is performed in which pump lasers 122 are activated at normal operating power. Then, following a delay of "Stabilize_Time" (exemplarily less than 50 ms) to allow the pump lasers to stabilize, steps 504 through 508 are performed as described above. If transmission fiber 110 is open when the pumps are activated in step 512, then step 508 is eventually performed and the pumps will be shut-down again. The total time between the activation of the pump lasers and their shut-down or power reduction should not exceed the eye-safe time. If transmission fiber 110 is not open, then restart was successful and pump lasers 122 remain activated.

Control unit 230 may be configured to perform other functions using measuring unit 225 besides detecting an open transmission fiber. For example, once transmission fiber 110 is open, then the Raman generated ASE noise power reaching ASE detector 228 depends on the position of the opening. Thus, as described in U.S. Pat. Nos. 7,116,471 and 7,283,292, control unit 228 may use the detected ASE noise power to estimate the position of the opening. It should be emphasized that the methods and systems described in U.S. Pat. Nos. 7,116,471 and 7,283,292 cannot be used to detect an open transmission fiber due to the presence of ASE from the gain medium of a discrete gain unit in a ROPA system. However, once the transmission fiber is open, and the ASE from the gain medium is not present, then the methods and systems as described in U.S. Pat. Nos. 7,116,471 and 7,283,292 can be used to estimate the position of the opening.

As another example, when transmission fiber 110 is not open, then as shown in FIG. 4, the ASE noise power measured by ASE detector 228 is correlated to the length of transmission fiber 110. On the other hand, the gain provided to signal channels 114 is correlated to the level of pump energy 112 reaching gain unit 200, which in turn is correlated to the length of transmission fiber 110, Thus, the ASE noise power measured by ASE detector 228 is correlated to the gain provided to signal channels 214, and can be used by control unit 230 to estimate this gain.

Figure 6:
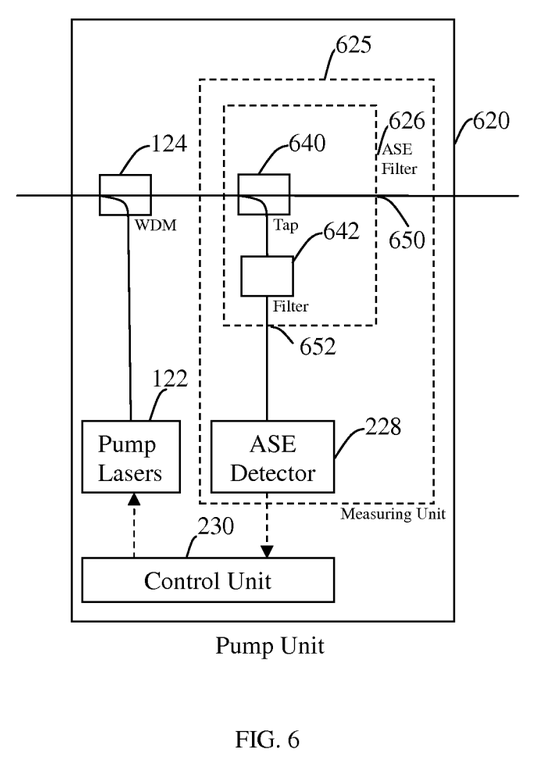
FIG. 6 shows an embodiment of a pump unit in which the ASE filter is implemented using two elements, a tap and a filter.

FIG. 6 shows an alternate embodiment of a pump unit 620, which includes a measurement unit 625. Measuring unit 225 includes an ASE Filter 626 which has an input port coupled to WDM 124, and two output ports, a first output port 650 coupled to the output of pump unit 220, and a second output port 652 coupled to ASE detector 228. The filter needs to be designed such that only wavelengths within the selected wavelength range are directed through port 652, while other wavelengths (containing the signal channels) are directed through port 650 with minimum attenuation. This filter may be implemented using a known single element filter (see e.g. FIG. 2a), such as a thin film filter or a fiber Bragg grating filter. However, in some cases the use of a single element to implement the ASE filter may lead to high attenuation through port 650, i.e. high attenuation of the signal channels. In this case it may be advantageous to implement the ASE filter using two elements, as shown in FIG. 6: a tap 640 and a filter 642. Tap 640 diverts a small portion (typically 1-2%) of the total input power (i.e. wavelengths both inside and outside the selected wavelength range) towards filter 642, while passing the majority of the total input power through port 650. In this manner, the signal channels exit port 650 with only minimum attenuation. Filter 642 blocks all wavelengths outside the selected wavelength band, and allows only wavelengths inside the selected wavelength range to pass through port 652 to ASE detector 228. Filter 642 may be omitted in the case where the selected wavelength range is defined to cover the entire communication band.

The embodiment shown in FIG. 6 may also be advantageous if it is desirable to measure other quantities related to the total input optical power in addition to the ASE noise power in the selected wavelength range. For example, a splitter (not shown) may be placed between elements 640 and 642 to divert part of the tapped power to another detector or to an Optical Channel Monitor (OCM) (neither shown).

Figure 7:
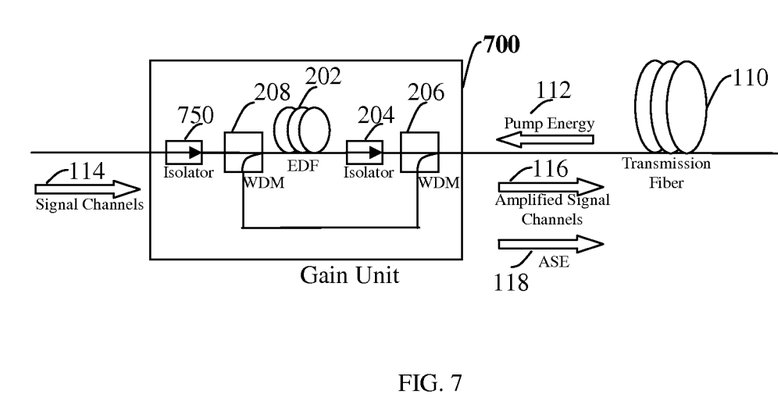
FIG. 7 shows an alternative embodiment of a gain unit of a ROPA system in accordance with an embodiment disclosed herein.

FIG. 7 shows an alternative embodiment of a gain unit 700 of a ROPA system in accordance with an embodiment disclosed herein. In addition to elements common with those of gain unit 200, gain unit 700 includes a second WDM 708 (replacing WDM 208) and a second isolator 750. WDM 708 is placed at the input of EDF 202 such that the EDF is forward pumped instead of backward pumped as in FIG. 2. Thus, pump energy 112 is routed such that it propagates along the EDF in the same direction as signal channels 114. This configuration may reduce the noise figure of the ROPA compared to the backward pumping configuration for some types of EDF, assuming that the signal channel loss introduced by WDM 708 is not too large. Isolator 750 stops back-reflections from the fiber upstream of gain unit 700 from entering EDF 202. This may be advantageous if the quality of the upstream fiber is such that it produces relatively high back-reflections.

Figure 8:
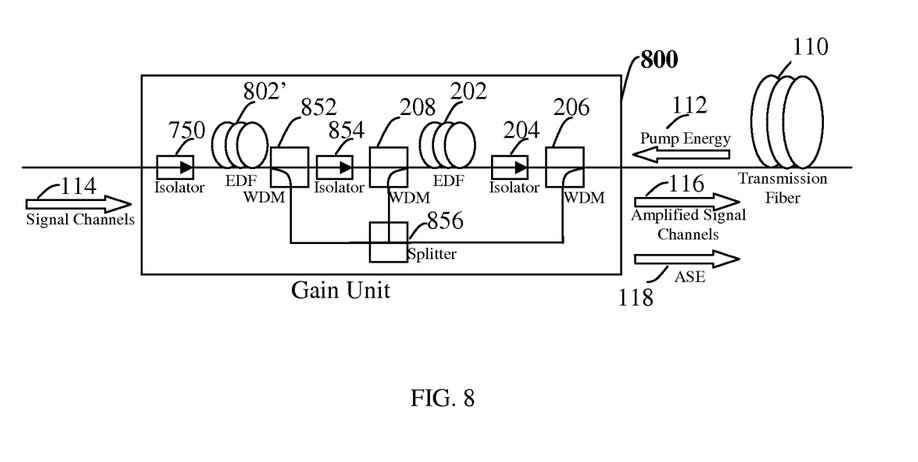
FIG. 8 shows yet another alternative embodiment of a gain unit of a ROPA system in accordance with an embodiment disclosed herein.

FIG. 8 shows an alternative embodiment of a gain unit 800 of a ROPA system in accordance with an embodiment disclosed herein. In addition to elements common with those of gain unit 700, gain unit 800 includes an EDF split into two sections (replacing EDF 202), a first EDF section 802 and a second EDF section 802'. Gain unit 800 further includes a third WDM 852, a third isolator 854 and a pump splitter 856. Isolator 854 is placed between the two sections of the EDF, thus preventing ASE noise created in section 802 from propagating back into section 802'. Splitting the EDF into two sections with an isolator in between may be advantageous with respect to noise figure and gain performance of the ROPA when the ASE noise power created within the EDF is high. In order to pump both EDF sections, pump splitter 856 splits pump energy 112 into two portions, one of which is routed to WDM 808 used to pump EDF 802, and the other of which is routed to WDM 852 to pump EDF 802'.

Figure 9:
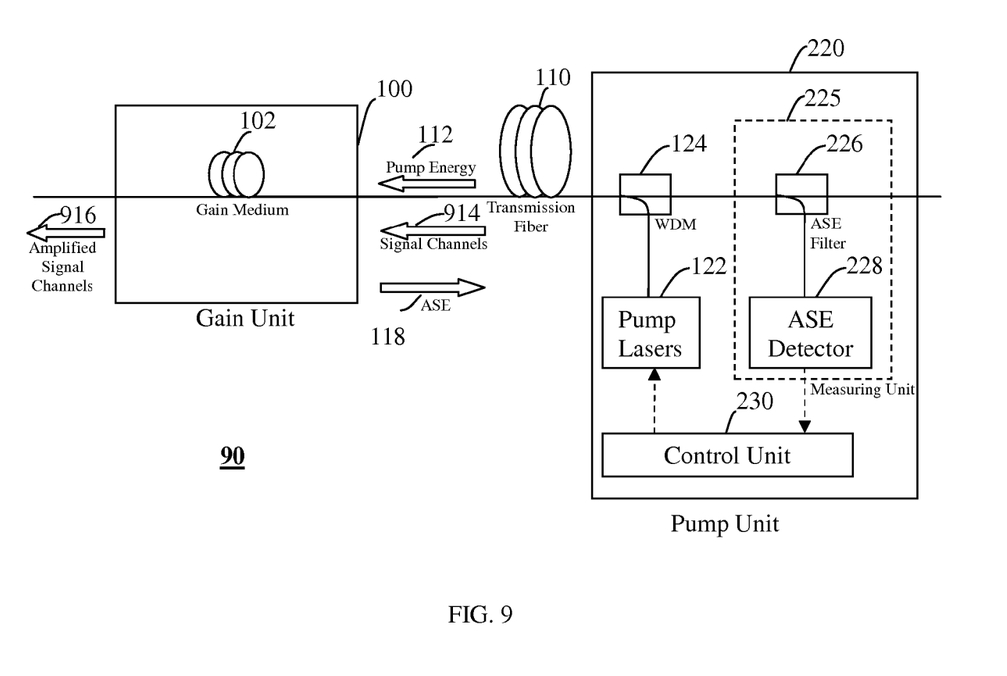
FIG. 9 shows schematically a ROPA system in accordance with an embodiment disclosed herein in which the pump unit is upstream of the gain unit.

FIG. 9 shows schematically a ROPA system 90 in accordance with an embodiment disclosed herein in which the pump unit is upstream of the discrete gain unit. In system 90, pump unit 220 is upstream of gain unit 100 as opposed to downstream as in FIG. 2. Thus, signal channels 914 propagate from the pump unit along transmission fiber 110 to the gain unit, and then amplified signal channels 916 continue propagating downstream along the communication system.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

The invention claimed is:

1. A method of detecting an opening in an optical transmission fiber of a remote optically pumped amplifier (ROPA) system which includes a pump unit having one or more pump lasers, the pump unit remotely coupled to a discrete gain unit through the optical transmission fiber, the gain unit having a gain medium which generates a gain medium amplified spontaneous emission (ASE) noise, the method comprising the steps of:
   a) measuring an optical power in a selected wavelength range, the optical power entering the pump unit from the transmission fiber; and
   b) determining that the measured optical power lacks a gain medium ASE noise power component, wherein the lack of the gain medium ASE noise power component indicates that the optical transmission fiber is open.

2. The method of claim 1, further comprising the step of:
   c) responsive to an indication that the optical transmission fiber is open, performing an action on the one or more pump lasers to remove a laser hazard resulting from the open optical transmission fiber.

3. The method of claim 2, wherein the action includes a shut-down or a power reduction of the one or more pump lasers.

4. The method of claim 1, wherein the selected wavelength range is substantially inside a communication band used for signals channels and excludes specific wavelengths dedicated to the signal channels.

5. The method of claim 1, wherein the selected wavelength range is external to a communication band used for signals channels.

6. The method of claim 1, wherein the selected wavelength range is chosen such that a difference between the gain medium ASE noise power component and other components comprising the optical power is maximized.

7. The method of claim 1, wherein the step of determining includes comparing the measured optical power with a predetermined fixed decision threshold.

8. The method of claim 7, wherein the predetermined fixed decision threshold is above an optical power which does not include the gain medium ASE noise power component.

9. The method of claim 1, wherein the step of determining includes determining a decrease of the measured optical power relative to an optical power previously measured within a predetermined timeframe.

10. An apparatus for detecting an opening in an optical transmission fiber of a remote optically pumped amplifier (ROPA) system which includes a pump unit having one or more pump lasers, the pump unit remotely coupled to a discrete gain unit through the optical transmission fiber, the gain unit having a gain medium which generates a gain medium amplified spontaneous emission (ASE) noise, the apparatus comprising:
    a) a measuring unit used to measure an optical power in a selected wavelength range, the optical power entering the pump unit from the transmission fiber; and
    b) a control unit used to monitor the measured optical power and to determine whether the optical power lacks a gain medium ASE noise power component, wherein the lack of the gain medium ASE noise power component indicates that the optical transmission fiber is open.

11. The apparatus of claim 10, wherein, responsive to an indication that the transmission fiber is open, the control unit is further used to perform an action on the one or more pump lasers to remove a laser hazard due to the open optical transmission fiber.

12. The apparatus of claim 10, wherein the measuring unit includes an ASE filter used to select the selected wavelength range.

13. The apparatus of claim 12, wherein the ASE filter includes a tap coupled to a filter.

14. The apparatus of claim 10, wherein the gain medium ASE noise power component comprises at least 20% of the optical power when the transmission fiber is not open.

15. The apparatus of claim 10, wherein the gain medium is an Erbium Doped Fiber.

16. The apparatus of claim 15, wherein the selected wavelength range is located within the range 1530-1535nm.

17. The apparatus of claim 15 wherein the selected wavelength range is adjacent to but external to a C-Band wavelength range.

18. A method of detecting an opening in an optical transmission fiber of a remote optically pumped amplifier system which includes a pump unit having one or more pump lasers, the pump unit remotely coupled to a discrete gain unit through the optical transmission fiber, the gain unit having a gain medium which generates a gain medium amplified spontaneous emission (ASE) noise, the method comprising the steps of:
    a) determining whether a gain medium ASE noise power component is present or absent in an optical power within a selected wavelength entering the pump unit from the transmission fiber, wherein the absence of the gain medium ASE noise power component indicates that the optical transmission fiber is open; and
    b) responsive to an indication that the optical transmission fiber is open, performing an action on the one or more pump lasers to remove a laser hazard due to the open optical transmission fiber.

19. The method of claim 18, wherein the selected wavelength range is selected to exclude wavelengths dedicated to signal channels and to maximize the proportion of the gain medium ASE noise power component in the optical power.

20. The method of claim 18, wherein the action includes a shut-down or a power reduction of the one or more pump lasers within an eye-safe time.

* * * * *